Feb. 19, 1924.
W. L. HATHERLEY
LIFTING HOOK
Filed Jan. 10, 1923
1,484,495
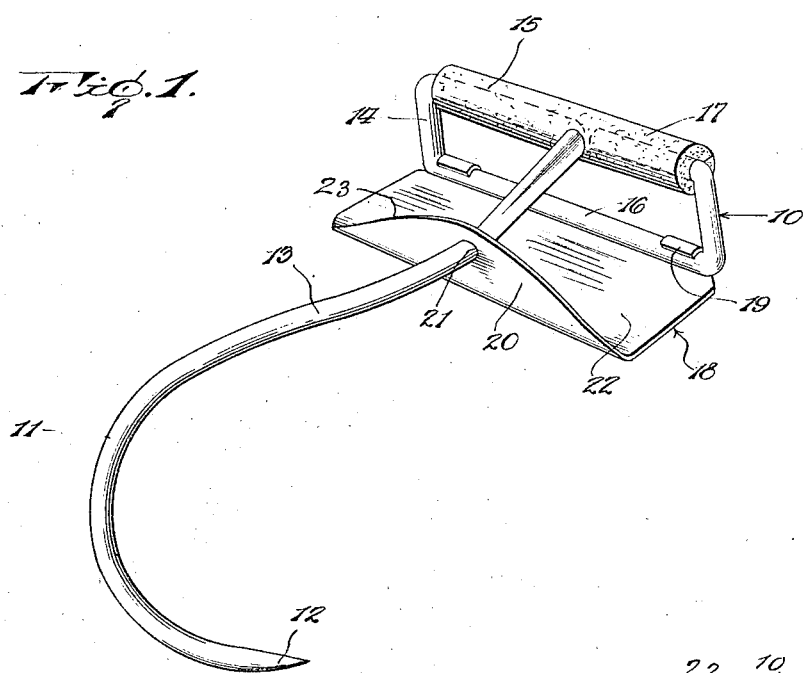
Fig. 1.
Fig. 2.
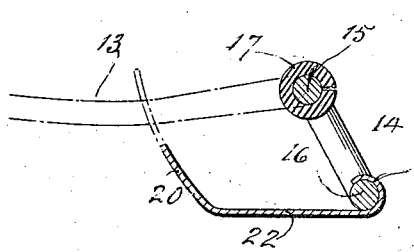
Fig. 3
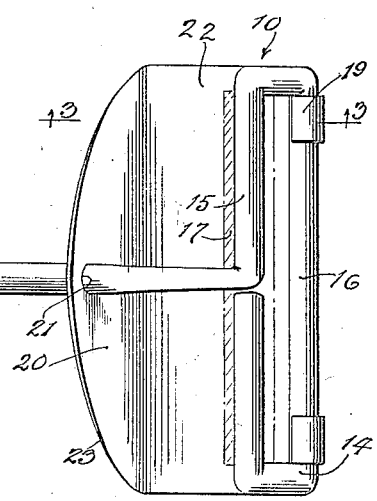
Inventor
W. L. Hatherley
By Lacy & Lacy, Attorneys Patented Feb. 19, 1924.

1,484,495

UNITED STATES PATENT OFFICE.

WILLIAM L. HATHERLEY, OF SAN BERNARDINO, CALIFORNIA.

LIFTING HOOK.

Application filed January 10, 1923. Serial No. 611,910.

*To all whom it may concern:*

Be it known that I, WILLIAM L. HATHERLEY, a citizen of the United States, residing at San Bernardino, in the county of San Bernardino and State of California, have invented certain new and useful Improvements in Lifting Hooks, of which the following is a specification.

My invention relates to hand hooks for lifting bulky articles, such as bales or bundles, and is particularly intended for handling and loading hay or straw.

Such bales or the like are generally difficult to handle with the bare hands, and one object of the invention is to provide hooks to be carried in the operator's hands and intended to firmly grip the bale, at the same time protecting the operator's hands from injury.

In the accompanying drawing one embodiment of the invention is illustrated; and

Figure 1 shows a perspective view of the hook forming the subject matter of the present invention;

Figure 2 is a top plan view of the hook with some of the parts removed; and

Figure 3 is a longitudinal section along line 3—3 of Figure 2.

This implement consists of a handle portion 10 and a hook portion 11, and is preferably formed out of a single piece of iron rod. The hook portion 11 being bent to a fairly large radius, as seen in Figure 1, terminating with a sharp point 12. The hook portion 11 is continued rearwardly by a shank 13, terminating with the handle 10, which is of rectangular loop shape and bent down to form an obtuse angle with the shank 13, and in the same direction as the hook portion 11. In this manner the handle consists of two parallel side members 14 connecting the T-portion 15, forming the top of the handle, and the guard portion 16 spaced from the T-portion 15 and forming the bottom part of the handle 10.

Around the T-portion 15, nearest the shank 13, a piece of rubber tube or leather 17 is placed for the purpose of furnishing a good hold for the hand, room enough being provided between the T-portion 15 and the guard member 16, for the operator's fingers and thumb to be inserted.

A shield 18 of the same length as the handle 10 has a flat under side 22 with bent fingers 19 engaging the guard member 16, as best seen in Figures 1 and 3. These fingers partly surround the guard member 16 and are spaced apart so as to abut with their outer edges against the side members 14 of the handle and in this manner keep the shield from sliding along the handle. The forward end 20 of the shield 18 is bent upwardly and provided with an opening 21 for engaging around the shank 13 and holding the shield firmly thereon. This forward end 20 is preferably rounded or sloped down toward the flat under portion of the shield 18, as at 23.

When using this hook the operator grips the T-portion of the handle, placing his thumb in the rectangular space formed between the T-portion and the guard portion 16 so that his knuckles point forward in the handle, and then closes his grip around the rubber sleeve of the T-portion 15. It will thus be seen that his fingers will have a complete protection from any sharp points or rough surfaces on the bale or bundle to be handled, so that after inserting the hook in the bale he can press the shield against the same and easily lift it. It is evident that the shield 18 will be made of any stiff material, either sheet metal or sole leather, but that in the latter case the fingers 19 would have to be extended far enough to connect them with the flat bottom of the shield by means of stitches or rivets.

Having thus described the invention what is claimed as new is:

1. A lifting hook comprising a rectangular loop, a shank and a hook portion formed as integral parts from a metallic rod; one side of the loop constituting a finger guard and the opposite side a T-handle together with the shank extending at right angles medially therefrom, said shank terminating with the hook portion pointing in the direction of said finger guard.

2. A lifting hook comprising a rectangular loop, a shank and a hook portion formed as integral parts from a metallic rod; one side of the loop constituting a finger guard and the opposite side a T-handle together with the shank extending at right angles medially therefrom, said shank terminating with the hook portion pointing in the direction of said finger guard; a metallic shield partly enfolding said finger guard and provided with an aperture in which said shank engages, and a pliable sleeve surrounding said T-handle.

In testimony whereof I affix my signature.

WILLIAM L. HATHERLEY [L. S.]